Figure 1:
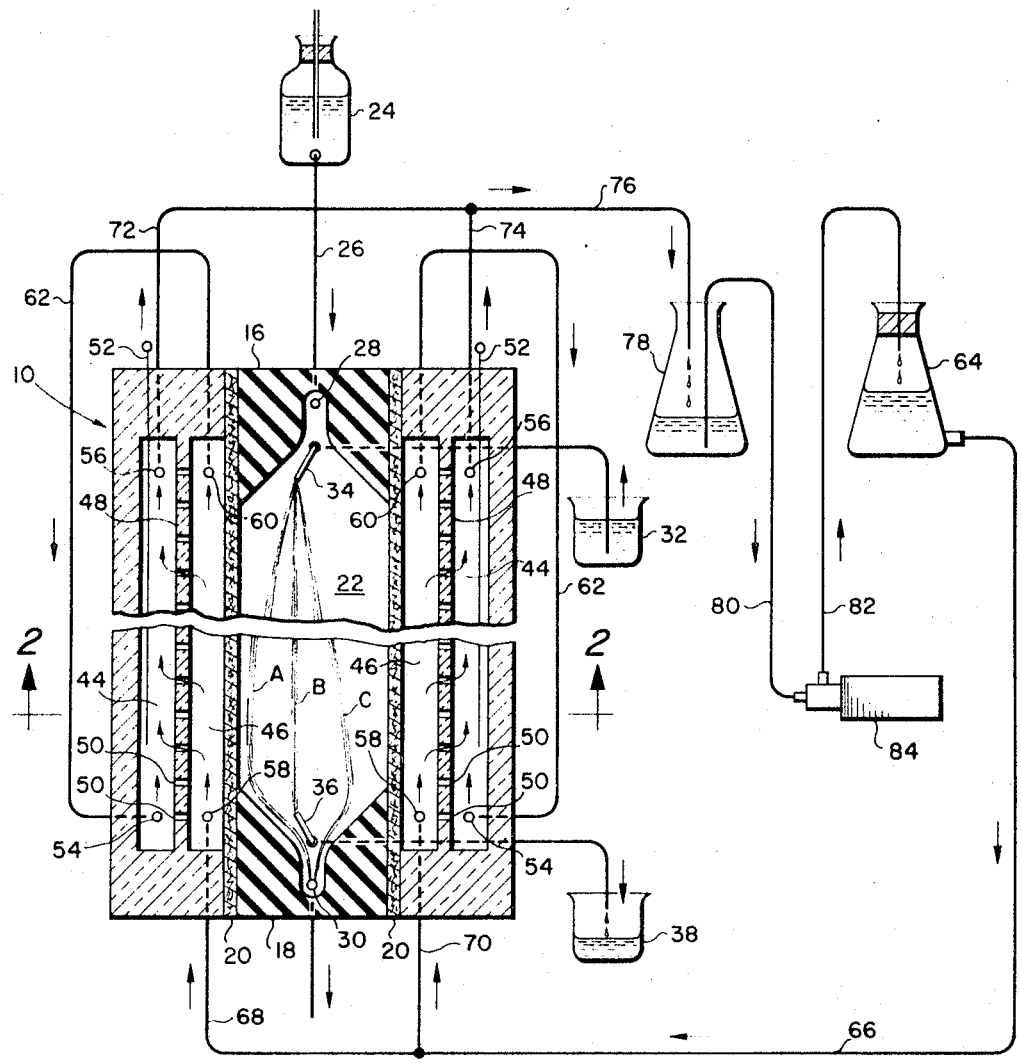

VICTOR R. HUEBNER
*INVENTOR.*

BY

ATTORNEY

United States Patent Office 3,458,428
Patented July 29, 1969

3,458,428
CONTINUOUS PARTICLE ELECTROPHORESIS APPARATUS HAVING IMPROVED PARTICLE BAND STABILITY
Victor R. Huebner, Fullerton, Calif., assignor to Beckman Instruments, Inc., a corporation of California
Filed Nov. 3, 1966, Ser. No. 591,733
Int. Cl. B01k 3/10; B01d 59/42, 13/02
U.S. Cl. 204—301                3 Claims The present invention relates generally to continuous particle electrophoresis apparatus in which an electric potential gradient is applied across an electrophoresis space containing a flowing electrolyte curtain into which a sample suspension is introduced and electrophoretically separated into its components.

Electrophoresis, in general, is the phenomenon of migration of charged particles or ions in an electrolytic carrier medium under the influence of an electric field. This phenomenon can be used to separate small particles which, by reason of different surface properties, exhibit different concentrations of surface charge in the given medium. As a result of these distinctive surface properties, the mobilities of various classes of charged particles in the carrier medium will be different under the influence of the electric field.

One method of accomplishing electrophoretic separation is termed continuous free-flow particle electrophoresis in which an electrolyte is made to flow freely in a uniform sheet or curtain within the confines of an electrophoresis space. An electric potential gradient is applied to the curtain at some angle to the flow, typically perpendicular thereto. A sample, continuously introduced at some point into the electrolyte curtain, flows in a narrow band in the absence of the potential gradient. When the potential gradient is applied to the curtain, the sample particles are separated under the influence of the electric field into various particle groups or components depending upon the electrophoretic mobility of the respective particles, the strength of the field and the length of time the particles remain in the field. Particles of different mobility are concentrated in distinctive zones or component bands which fan out from the point of sample application.

The potential gradient may be applied to the electrolyte in the electrophoresis space by various well known techniques. One approach utilizes a buffer solution flowing in an electrode channel on each side of the electrophoresis space and maintained in ionically-conductive contact with the curtain flowing in the space. Wire electrodes, immersed in the buffer solution flowing in the electrode channels, couple the electrolyte in the electrophoresis space to a source of D.C. electrical power. The electrode channel and the electrophoresis space are separated by a barrier or membrane which is ion-permeable but does not permit significant bulk flow of electrolyte or buffer solution between the electrode channel and electrophoresis space.

One problem which arises with the above-described apparatus is the eventual intrusion of ions, such as H+ and OH−, generated respectively at the positive and negative electrodes, into the curtain electrode. These ions alter the conductivity and pH of the electrolyte resulting in loss of lateral stability of the particle bands. Apparatus to overcome the aforementioned problem is disclosed in the copending application of A. Strickler, Ser. No. 481,-679, filed Aug. 23, 1965, now Patent No. 3,412,008 and assigned to the assignee of the present application.

In one form of the apparatus of the copending application, shown in FIGS. 3 and 4 thereof, an electrode assembly is provided on each side of the electrophoresis space. The electrode assembly includes an intermediate or bridging channel disposed between the outer surface of the ion-permeable membrane and the electrode channel. The channels are separated by a partition provided with a row of connecting holes serving to bring the channels into fluid communication. Buffer solution enters the bridging channel at the lower end thereof and splits into two streams—one exiting at the upper end of the bridging channel, the other passing through the holes at a velocity sufficient to counter inward migration of ions and leaving the cell at the upper end of the electrode channel. This apparatus effectively prevents the transfer of electrolysis products to the electrophoresis space thus improving particle band stability.

It is a principal object of the present invention to further improve electrophoretic component band stability by eliminating the necessity for close tolerance machining of the connecting holes and increasing the flushing velocity at the uppermost portion of the ion-permeable membrane.

Figure 2:
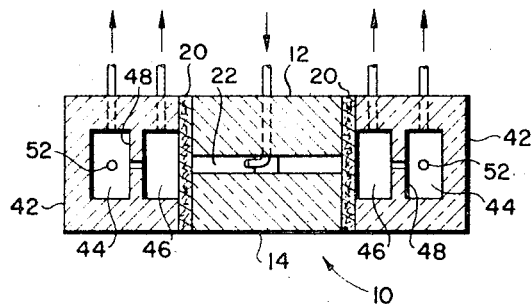

The novel features which are believed to be characteristic of the invention are set forth with particularity in the appended claims. The invention itself however, together with further objects and advantages thereof can best be understood by reference to the following description taken in connection with the accompanying drawings in which:

FIG. 1 is a schematic of a continuous particle electrophoresis apparatus including an electrophoresis cell and an electrolyte circulation system in accordance with the present invention; and FIG. 2 is a cross-sectional view of the cell shown in FIG. 1 taken along the plane 2—2.

Turning now to the drawings, an electrophoresis cell 10 is shown which comprises a pair of flat, elongated transparent plates 12 and 14 mounted, in parallel, spaced-apart relation. The plates 12 and 14 define, in conjunction with upper and lower end gaskets 16 and 18 and a pair of ion-permeable membranes 20, an electrophoresis space 22. The gaskets 16 and 18 are preferably symmetrical, having Y-shaped contours so that the curtain electrolyte is subject to smooth laminar flow. The advantages of such a cell shape are described in greater detail in the copending application Ser. No. 481,855 of A. Strickler, filed Aug. 23, 1965, now Patent No. 3,412,007 and assigned to the present assignee.

Curtain electrolyte is supplied from a constant pressure reservoir 24, via a conduit 26, to an inlet 28 at the top of the inverted Y defined by the gasket 16. The curtain vents from an outlet 30 at the lower extremity of the Y-shaped section defined by the gasket 18 to atmospheric pressure at a fixed level below the cell 10.

A sample flow system may be used similar to that disclosed in the copending application Ser. No. 481,855, referenced above. Sample suspension from a sample reservoir 32 is introduced into the curtain flowing in the space 22 through a laterally positionable sample injection tube 34. The lateral adjustability of the tube 34 permits samples varying in degree and polarity of dispersion to be accommodated. A similar arrangement is provided within the lower Y-shaped portion of the electrophorphoresis space 22. A laterally positionable tube 36 is provided which may be adjusted to intercept any selected portion of the electrophoretic particle band pattern and deliver it to an external vessel 38. Another mode of operation is to scan the particle band pattern by slowly moving the tube 36 laterally to deliver successive fractions to a series of collection vessels. Uncollected particle fractions are vented together with the curtain electrolyte at the bottom of the lower Y via the outlet 30. Ordinarily, this electrolyte is discarded. However, it may be recirculated by passing it through a suitable filter and returning it to the supply reservoir 24.

Abutting the outer surface of each of the ion-permeable membranes 20 is a housing 42 defining an electrode channels 44 and 46 run substantially the length of channel 46 is interposed between the electrode channel 44 and the outer surface of the membrane 20. The channels 44 and 46 run substantially the length of the electrophoresis space 22 and are separated from one another by a flow-directing means (the function of which will be described below. The flow-directing means may take the form of a partition 48 having a row of horizontal holes 50. The holes 50 are provided along the entire length of the partition 48 and place the channels 44 and 46 in fluid communication with one another.

A wire electrode 52, of platinum or the like, supported by the housing 42, is disposed in each electrode channel 44. A suitable source of D.C. power (not shown) is connected between the electrodes 52, whereby one electrode serves as the anode and the other as the cathode.

A preferred arrangement for flowing buffer solution in the channels 44 and 46 in accordance with the present invention is shown in FIG. 1. The buffer solution may have any suitable composition; solution having the same composition as that of the electrolyte curtain for approximate match in pH, conductivity, specific gravity and viscosity may be utilized. Each electrode channel 44 is provided with a buffer solution inlet port 54 near the bottom and a buffer outlet port 56 at the top; similarly, each bridging channel 46 has a buffer inlet port 58 adjacent the lower extremity and a buffer outlet port 60 near the top. On each side of the cell 10, a conduit 62 connects the bridging channel outlet port 60 with the electrode channel inlet port 54. A buffer solution supply container 64 is connected, via conduits 66, 68 and 70 to the inlet ports 58 leading to the bridging channels 46. Buffer solution leaving the electrode channel outlet ports 56 flows through conduits 72, 74 and 76 and is accumulated in a vessel 78. Here, electrolysis gases are released and the acid and base formed respectively at the anode and cathode are mutually neutralized. The mixture collected in the vessel 78 is returned, via conduits 80 and 82, to the supply container 64 by a suitable pump 84.

In operation, sample introduced into the curtain is electrophoretically separated into components A, B and C, for example, when a potential is applied across the curtain by way of the electrodes 52 and the buffer solution flowing within the channels 44 and 46. A portion of the buffer solution entering each bridging channel 46 through the port 58 flows through the apertures 50 in the partition 48 to the electrode channel 44 and exits via the outlet port 56. The cross-flow velocity through the holes 50 is more than sufficient to counter inward migration of electrolytically generated ions such as H+ and OH−. This contributes toward extremely stable operating conditions in the curtain. The remainder of the buffer solution introduced into the bridging channel 46 flows upward in that channel to the outlet port 60 and from there to the electrode channel inlet 54 by way of the external conduit 62. This buffer, along with that passing through the holes 50, flushes electrolysis products away from the electrode 52. Alternatively, equally satisfactory results may be obtained by reversing the buffer flow pattern, that is, by introducing buffer through the port 60 and removing it from the port 54, ports 56 and 58 being connected by an external conduit.

The total buffer flow rate through the channels 44 and 46 is governed, of course, by the external pressure applied to the buffer and the flow restrictions in the fluid circuit. The proportion of buffer flowing from port 60 to port 54 is dependent upon the relative flow resistance of path 58 to 60 to 54 versus the path from the bridging channel 46 to the electrode channel 44 through the apertures 50. With a suitably dimensioned external connecting tube 62, this ratio is governed primarily by the size and number of interconnecting holes 50. Satisfactory operation may be achieved utilizing five to five hundred interconnecting holes having diameters ranging from 0.001 to 0.10 inch in a cell about 30 cm. long. When channels 44 and 46 have ⅛ inch cross sections, fifty 0.010 interconnecting holes in each electrode assembly will allow approximately equal amounts of buffer to flow directly from channel 46 to channel 44 and from port 60 to port 54. With this arrangement, the pressure difference across any one hole 50 in the partition 48 is the same as the pressure difference across any other hole, regardless of the relative sizes of the holes. Consequently, approximately the same flow velocity is obtained across each connecting hole regardless of discrepancies in diameters. This constancy of lateral velocity insures optimum conditions in preventing electrolysis products diffusing from the electrode channel 44 to the bridging channel 46. Furthermore, a reasonable total buffer flow rate (10 to 1000 ml. per minute), if coupled to a reasonable flow between ports 60 and 54 (5% to 99% of the total flow), will insure adequate flushing of all portions of the membranes 20. This serves to greatly improve electrical field homogeneity and thereby provide better electrophoretic stability.

It will be obvious to those skilled in the art that various modifications may be made to the specific exemplary embodiments of the invention described. While particular embodiments have been discussed, it will be understood that the invention is not limited thereto and that it is contemplated to cover in the appended claims any such modifications as fall within the true spirit and scope of the invention.

What is claimed is:

1. In a continuous particle electrophoresis apparatus comprising means defining an electrophoresis space for conducting a flowing electrolyte curtain, means adjoining each side of said electrophoresis space whereby a potential gradient may be applied across said electrolyte curtain, the latter means comprising:

an ion-permeable membrane having an inner and an outer surface, said inner surface being in contact with said electrolyte in said electrophoresis space;

a housing abutting said outer surface of said membrane, said housing defining an electrode channel and a bridging channel, said bridging channel being interposed between said electrode channel and said outer surface of said membrane, said channels extending substantially the length of said electrophoresis space and being separated by a flow-directing means;

an electrode disposed in said electrode channel;

a source of electrical power connected to said electrode; and means for flowing buffer solution in said channels including inlet ports in adjacent ends of said channels and outlet ports in the opposite, adjacent ends of said channels, means for connecting said bridging channel outlet port to said electrode channel inlet port whereby a portion of the buffer solution entering said bridging channel inlet port exits at said bridging channel outlet port and flows to said electrode channel inlet port, and the remainder of said buffer passes through said flow-directing means to said electrode channel, the buffer in said electrode channel leaving through said electrode channel outlet port, said flow-directing means providing a counter flow of buffer to prevent ions generated at the electrode from reaching the electrophoresis space.

2. Apparatus as defined in claim 1 in which: said flow-directing means comprises a perforated partition between said channels.

3. Apparatus as defined in claim 2 which includes:
a buffer reservoir connected to said bridging channel inlet port for supplying buffer thereto;
a buffer collection container connected to said electrode channel outlet port for receiving buffer circulated through said channels; and
means for pumping buffer from said collection container to said reservoir.

References Cited

UNITED STATES PATENTS

| 2,555,487 | 6/1951 | Haugaard et al. | 204—180 |
| 3,412,007 | 11/1968 | Strickler | 204—299 |
| 3,412,008 | 11/1968 | Strickler | 204—301 |

JOHN H. MACK, Primary Examiner

A. C. PRESCOTT, Assistant Examiner

U.S. Cl. X.R.

204—180, 299